No. 743,090. PATENTED NOV. 3, 1903.
J. KOELNER.
APPARATUS FOR MIXING AND KNEADING DOUGH.
APPLICATION FILED JAN. 14, 1903.
NO MODEL.

Witnesses.
Robert Everitt
James L. Norris, Jr.

Inventor:
John Koelner.
By James L. Norris
Atty.

No. 743,090. Patented November 3, 1903.

UNITED STATES PATENT OFFICE.

JOHN KOELNER, OF LOUISVILLE, KENTUCKY.

APPARATUS FOR MIXING AND KNEADING DOUGH.

SPECIFICATION forming part of Letters Patent No. 743,090, dated November 3, 1903.

Application filed January 14, 1903. Serial No. 139,040. (No model.)

*To all whom it may concern:*

Be it known that I, JOHN KOELNER, a citizen of the United States, residing at Louisville, in the county of Jefferson and State of Kentucky, have invented new and useful Improvements in Apparatus for Mixing and Kneading Dough, of which the following is a specification.

My invention relates to apparatus for mixing and kneading dough, the same being particularly designed for use in mills for testing the flour as it is made to determine the proportion of water it will absorb and to place the same in condition for determining its baking qualities.

The object of the invention is to provide means whereby a single blade may be employed for both the mixing and kneading operations.

A further object of the invention is to provide means whereby the mixing and kneading blade may be longitudinally adjusted in a trough or receptacle, whereby the same is adapted to be used on a greater or less quantity of flour.

Other objects of the invention will hereinafter appear and the novel features thereof will be set forth in the claims.

Figure 1:
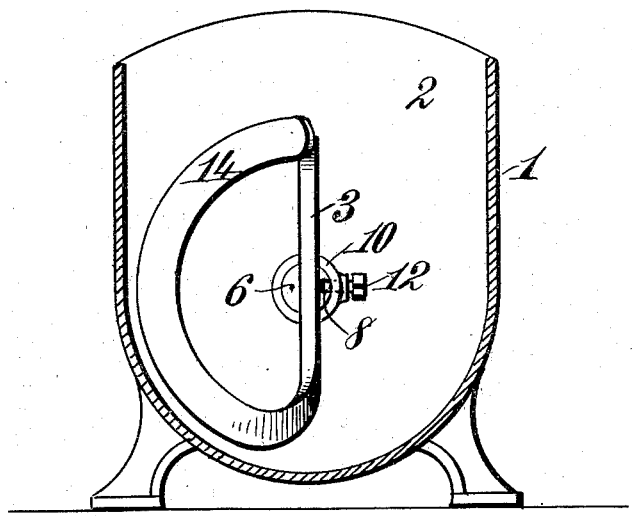
Figure 2:
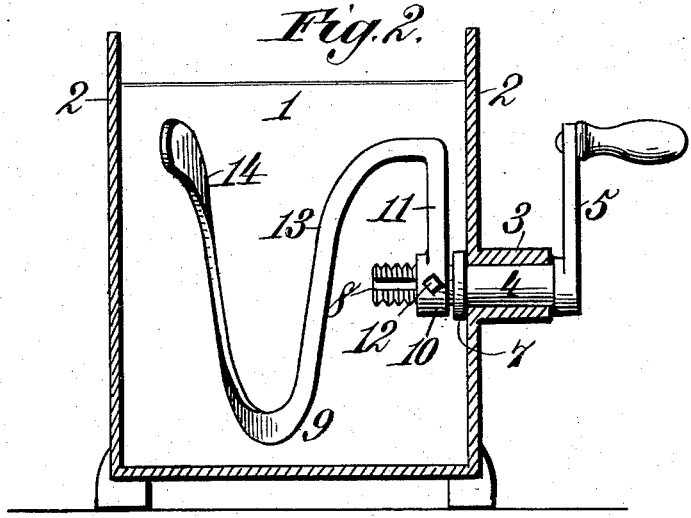
Figure 3:

In the drawings forming a part of this specification, Figure 1 is a transverse section of a mixing and kneading apparatus constructed in accordance with my invention. Fig. 2 is a longitudinal section of the same. Fig. 3 is a detail view of the mixing and kneading blade.

Like reference-numerals indicate like parts in the different views.

In carrying out my invention I employ a trough or receptacle 1, which is U-shaped in cross-section and has substantially parallel heads or abutments 2 at its opposite ends. Formed upon one of the heads 2 is a boss 3, in which is mounted a rotary shaft 4, having a crank or handle 5 on its outer end. The inner end of the shaft 4 when in place projects inwardly beyond the face of the head 2 and is provided with screw-threads 6, as shown. To prevent outward movement of the shaft 4, a collar 7 is secured thereto, which is adapted to bear against the inner surface of the head 2. The screw-threaded portion of the shaft 4 is provided with a longitudinal groove or channel 8 for a purpose which will hereinafter appear.

Mounted upon the shaft 4 and located within the receptacle 1 is a mixing and kneading blade 9, the same being adjustably secured to said shaft by means of an internally-screw-threaded hub 10, a radially-extending arm 11 thereon, and a set-screw 12, which extends through the hub 10 and is adapted to engage the inner end of the shaft 4 within the groove 8. The blade 9 is formed with a rectangular portion 13 and with a flat spirally-arranged portion 14 and constitutes as a whole a helix. The rectangular portion 13 extends from the outer end of the arm 11 to a point intermediate the ends of the blade 9, and the spirally-arranged portion 14 extends from the longitudinal center of said blade to its free end.

As heretofore stated, my improved device is designed for the purpose of mixing and kneading dough, to test the flour as it is produced in the mill, to determine the percentage of water it will absorb, and to place it in such condition that the baking qualities of the flour may be determined.

In operation the flour, water, and other ingredients of the dough are placed in the receptacle 1, and the blade 9 is adjusted so that the arm 11 lies in substantially close relation to the inner surface of the adjacent head 2 of said receptacle. This adjustment may be effected by loosening the set-screw 12 and turning the blade so that the hub 10 thereof will screw up upon the shaft 4, and then retightening the set-screw 12, so as to lock the blade in its adjusted position. Power is then applied to the crank 5 and the blade rapidly rotated. The ingredients of the dough when first placed in the receptacle 1 are in a liquid or watery condition, so that when the blade 9 is turned all of the constituents of the dough will be thoroughly mixed. Flour is of course added from time to time, and the dough is finally obtained in a thick plastic condition. The blade 9 is then adjusted outwardly on the shaft 4, so as to bring the free end of the spirally-arranged portion 14 thereof into substantially close relation to the adjacent head 2 of the receptacle 1. The rotation of the blade is then continued at a slow rate of speed by turning the crank or handle 5, and the different particles of the thick pasty dough will be acted upon by the flat faces of the spirally-arranged portion 14, the same being forced with a gentle squeezing compressing action against the adjacent head of the receptacle, the action imparted by the portion 14 of the blade being similar to that effected by the human hands in kneading, as contradistinguished from a compacting action.

The adjustment of the blade 9 for the kneading operation is effected by loosening the set-screw 12, turning the hub 10 of said blade on the screw-threaded portion of the shaft 4, and then retightening said set-screw. The degree of adjustment may be determined according to the quantity of dough under treatment. With a large quantity of dough of course the free end of the spirally-arranged portion 14 of the blade will be arranged at a greater distance from the adjacent head 2 of the receptacle 1 than if a small quantity of dough be treated.

Having thus described my invention, what I claim as new, and desire to secure by Letters Patent, is—

1. In a dough mixer and kneader, the combination with a receptacle, of a shaft, a kneading-blade mounted upon one end thereof and formed with an intermediate rectangular portion with a flat spirally-arranged free terminal portion, the blade as a whole constituting a helix, and means for locking the said kneading-blade at any desired adjustment on the shaft.

2. In a dough mixer and kneader, the combination with a receptacle, of a rotary shaft at one end thereof having a screw-threaded portion provided with a longitudinally-extending groove, a kneading-blade having an internally-screw-threaded hub at one end adapted to fit upon the screw-threaded portion of said shaft, and a set-screw projecting through said hub and adapted to fit within said groove, as and for the purpose set forth.

In testimony whereof I have hereunto set my hand in presence of two subscribing witnesses.

JOHN KOELNER.

Witnesses:
J. C. DODD,
M. W. RIPY.